March 15, 1966
R. F. HOZAK
3,239,927
METHOD OF MAKING CYLINDRICAL BINS OR THE LIKE
Filed Oct. 24, 1963
3 Sheets-Sheet 1
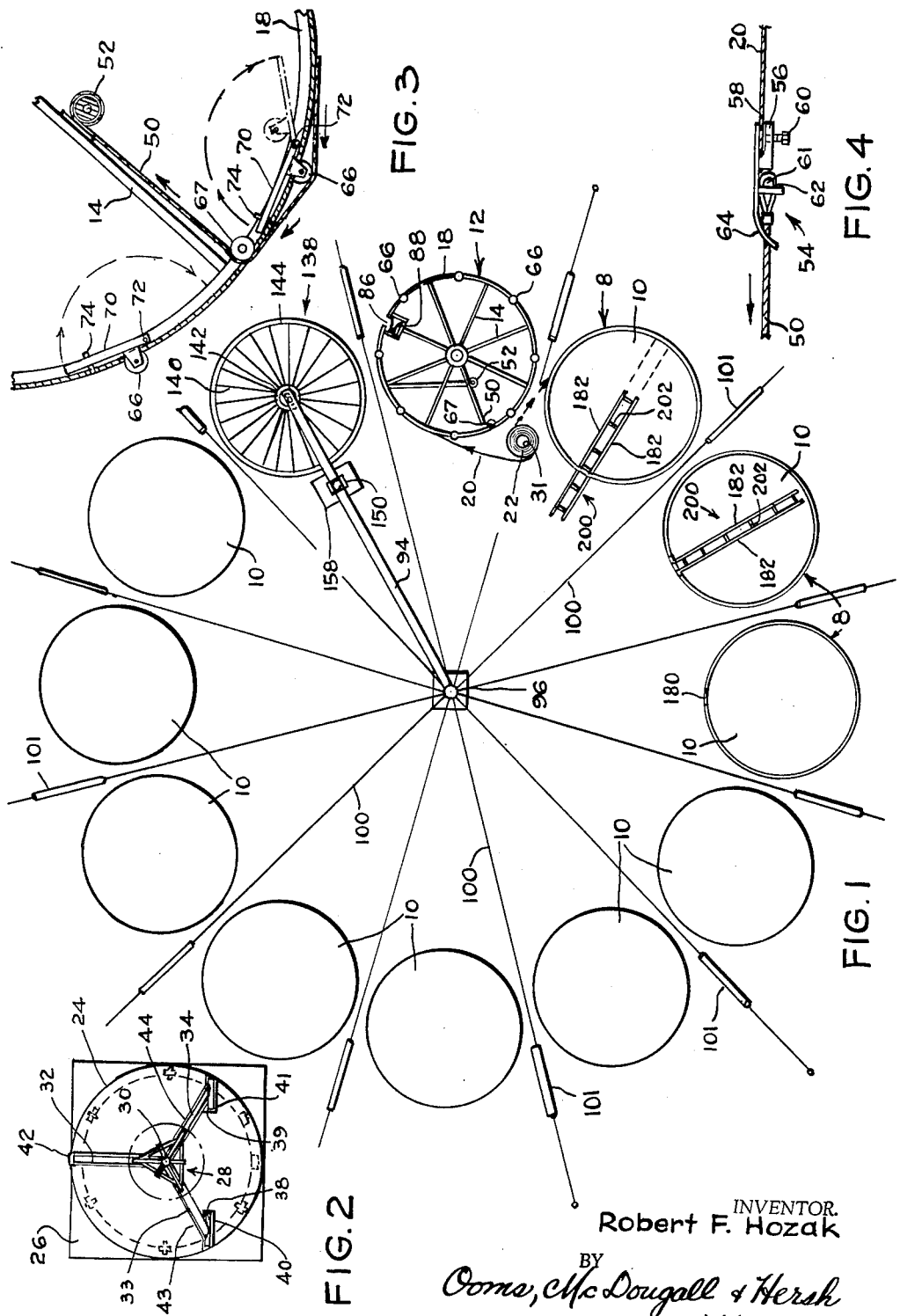
INVENTOR.
Robert F. Hozak
BY
Ooms, McDougall & Hersh
Attorneys March 15, 1966 R. F. HOZAK 3,239,927
METHOD OF MAKING CYLINDRICAL BINS OR THE LIKE
Filed Oct. 24, 1963 3 Sheets-Sheet 2

INVENTOR.
Robert F. Hozak
BY Oome, McDougall & Hersh
Attorneys

March 15, 1966  R. F. HOZAK  3,239,927
METHOD OF MAKING CYLINDRICAL BINS OR THE LIKE
Filed Oct. 24, 1963  3 Sheets-Sheet 3

INVENTOR.
Robert F. Hozak
BY
Ooms, McDougall & Hersh
Attorneys

# United States Patent Office 3,239,927
Patented Mar. 15, 1966

3,239,927
METHOD OF MAKING CYLINDRICAL
BINS OR THE LIKE
Robert F. Hozak, 417 E. 107th St., Chicago 28, Ill.
Filed Oct. 24, 1963, Ser. No. 318,746
6 Claims. (Cl. 29—429)

This invention relates to the construction of generally cylindrical bins, tanks or the like, adapted to hold bulk materials, such as dry granular or powdered materials or liquids, for example.

One object of the present invention is to provide a new and improved method whereby cylindrical bins may be made with a greatly reduced expenditure of time, labor and materials.

A further object is to provide for the construction of cylindrical bins with a minimum of apparatus and equipment, yet with speed and facility.

It is a further object of the present invention to provide a new and improved method whereby cylindrical bins are produced by forming cylindrical sections out of metal strip, hoisting the completed sections, and welding or otherwise joining the circular lower edge of each completed section to the circular upper edge of the succeeding cylindrical section, so that all of the welding and other operations involving manual labor are carried out at or near the ground level.

Another object is to provide a new and improved method whereby a length of steel or other metal strip may be pulled from a coil around a fixture, whereupon the length of metal strip may be severed from the coil and welded or otherwise joined at its ends to form a cylindrical element to be employed as a portion of the wall of the bin.

Another object is to provide a new and improved method of forming a vertical access slot in the cylindrcial bin, while providing means for transmitting tension across the slot so as to maintain the shape and integrity of the bin.

A further object is to provide a new and improved method of the foregoing character in which a reinforcing frame is inserted into the bin, through an opening cut therein near the lower end thereof, and then is swung upwardly against the wall of the bin, following which the access slot may be cut in the bin a little at a time, opposite the frame, while the frame is progressively welded to the bin.

Further objects and advantages of the present invention will appear from the following description, taken with the accompanying drawings, in which:

FIG. 1 is a general plan view showing an illustrative embodiment of the apparatus whereby cylindrical bins or tanks may be made in accordance with the present invention.

FIG. 2 is an enlarged plan view showing a turntable for supporting the coil of steel or other metal strip from which the bin is made.

FIG. 3 is a fragmentary enlarged plan view showing a portion of the circular fixture whereby the metal strip is formed into a cylindrical element.

FIG. 4 is a fragmentary enlarged plan view showing the device for connecting the metal strip to the cable whereby the strip is pulled around the circular fixture.

Figure 9:
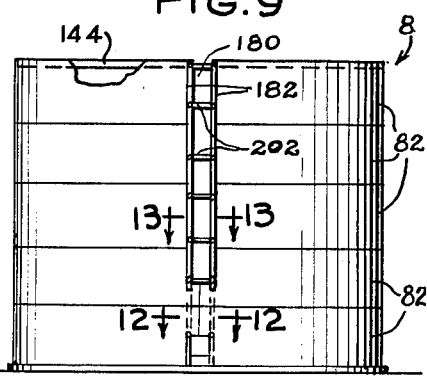
FIG. 9 is a view similar to FIG. 8 but showing the bin in a later stage of the method.
Figures 11, 12, 13:
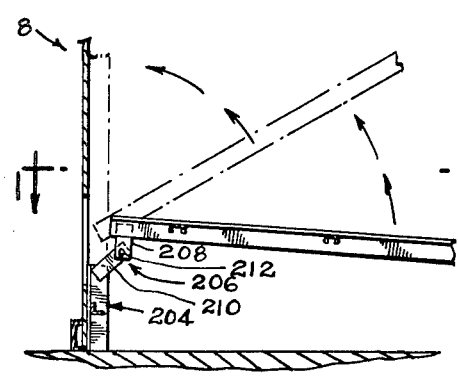
FIG. 11 is a fragmentary horizontal section, taken generally along the line 11—11 in FIG. 10.

FIGS. 12 and 13 are fragmentary horizontal sections showing different stages in the method, the views being taken generally along lines 12—12 and 13—13 in FIG. 9.

Figures 10, 14:
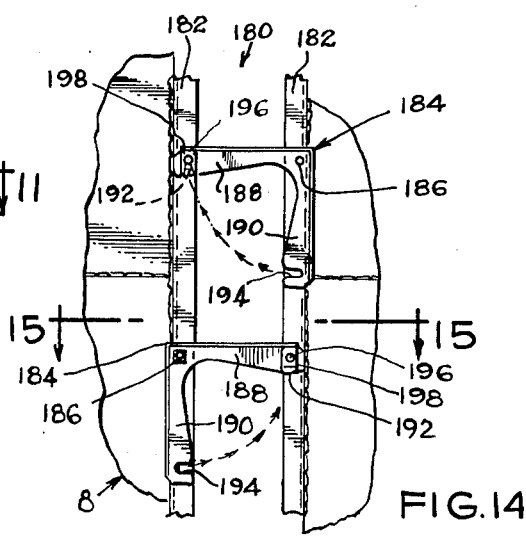
FIG. 10 is a fragmentary sectional view, taken generally along the line 10—10 in FIG. 8, and showing the manner in which the reinforcing frame for the access slot is inserted and swung upwardly into position.

FIG. 14 is a fragmentary elevation showing the completed access slot with the reinforcing frame and the tension transmitting levers in place.

Figure 15:
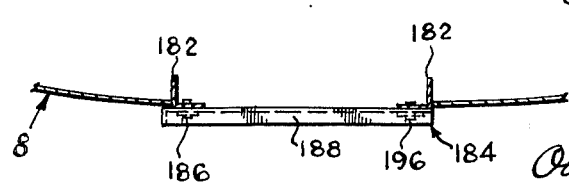

FIG. 15 is a fragmentary horizontal section, taken generally along the line 15—15 in FIG. 14.

If the drawings are considered in greater detail, it will be seen that FIG. 1 illustrates the method and apparatus of the present invention as applied to the construction of a plurality of cylindrical bins or tanks 8, which may be arranged as disclosed and claimed in the copending application of Robert F. Hozak, Serial No. 204,293, filed June 21, 1962, and entitled "Bulk Materials Handling Plant." In this case, each of the cylindrical bins is constructed on a flat slab or pad 10 which serves as a supporting foundation for the bin, and also as the lower wall of the bin. The slabs 10 are preferably made of concrete. It will be seen that the slabs 10 are circular in shape and are located at intervals around a larger circle, in accordance with the desired location of the bins.

For use in the construction of each bin, a circular fixture or form 12 is placed on the slab 10 where the particular bin is to be constructed. As shown, the fixture 12 is skeletal in construction and is provided with a plurality of spoke-like arms 14 radiating from a central hub 16. The outer ends of the arms 14 connect with a circular frame 18 corresponding generally in diameter to the desired internal diameter of the bin.

The bin is made from a strip 20 of steel or other suitable metal. The metal strip is received from the mill in the form of a coil 22 which may contain a considerable length of the strip. Normally, each coil 22 comprises a sufficient length of the metal strip to make at least one complete bin.

To provide for easy removal of the strip 20 from the coil 22, a turntable 24 or some other suitable device is provided for rotatably supporting the coil. The turntable 24 may be supported on the ground by a foundation member 26 which may be in the form of a heavy metal plate.

In this case, the coil 22 is located and retained on the turntable 24 by a spindle 28 having a central shaft 30 adapted to extend upwardly through the central opening 31 in the coil. As shown, three supporting arms 32, 33 and 34 radiate from the lower end of the central shaft 30 to provide a base for the spindle 28. Triangular or tapered plates 36 are welded or otherwise secured between the central shaft 30 and the arms 32–34 to center the coil 22 on the spindle and to reinforce the joints between the shaft and the arms.

It will be seen that pivots 38 and 39 are welded or otherwise secured to the outer ends of the arms 33 and 34. The pivots 38 and 39 are lined up with each other so as to extend along a common pivot axis.

As shown to best advantage in FIG. 2, the turntable 24 is preferably formed with grooves or sockets 40 and 41 for receiving the pivots 38 and 39. As shown, the turntable 24 is formed with a radial groove 42 for receiving the arm 32. Similar radial grooves 43 and 44 are formed in the turntable 24 to receive the arms 33 and 34. It will be seen that the sockets 40 and 41 connect with the grooves 43 and 44.

Figure 6:
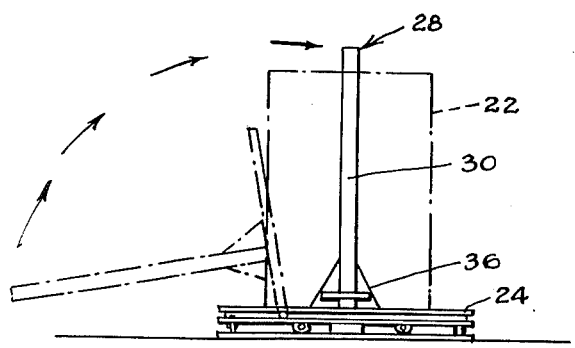
FIG. 6 is an elevational view showing the turntable and spindle for supporting the coil of metal strip.
Figure 7:
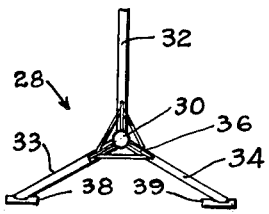
FIG. 7 is a plan view showing the spindle removed from the turntable.

Because of the provision of the pivots 38 and 39 and the sockets 40 and 41, the spindle 28 may be swung between its normal or vertical position shown in full lines in FIG. 6, and a generally horizontal loading position, shown in broken lines in FIG. 6. When a new coil 22 is to be mounted on the turntable 24, the spindle 28 may be swung downwardly until the central shaft 30 is in a position which is approximately horizontal. The new coil may then be slipped over the central shaft 30. During this operation, the coil may be carried by a fork lift truck, a crane, or some other device capable of supporting the weight of the coil. The spindle 28 is then swung to its vertical position so as to bring the coil 22 into its desired position on the turntable. The crane or fork lift truck may also be used to swing the coil and the spindle to their normal operating positions.

In practicing the method of the present invention, the metal strip 20 is pulled around the circular fixture 12 so that the strip will be formed into a cylindrical shape. As shown, the strip 20 is adapted to be pulled around the fixture 12 by upper and lower cables 50 which are adapted to be reeled in by a dual winch 52 mounted on the fixture 12. As shown, the winch 52 is preferably mounted within the fixture 12 and may be supported on one or more of the radial arms 14.

The ends of the cables 50 may be secured to the leading end of the strip 20 by a suitable fastening device 54 which may comprise a clamping bar 56 having a slot 58 therein for receiving the strip 20. Clamping screws 60 may be threaded into the bar 56 so as to clamp against the strip in the slot 58. Each cable 50 may be suitably secured to the bar 56, as by means of a pin 61 extending through an eye or loop 62 joined on the end of the cable. A curved plate or shoe 64 may be mounted on the clamping bar 56 for engaging the fixture 12 so that the bar 56 will slide more easily around the fixture. Each cable 50 may be threaded around a plurality of pulleys 66 which are spaced around the fixture 12 so as to guide the cable around the fixture. As shown to advantage in FIG. 3, each cable 50 is threaded inwardly around a pulley 67 to the winch 52.

The pulleys 66 may be arranged so that they may be retracted or withdrawn inwardly, out of the way of the strip 20. Thus, each pulley 66 may be mounted on an arm 70 which is swingable about a pivot 72 connected to the circular frame 18 of the fixture 12. A latching pin or lug 74 on the frame 18 retains each arm 70 in its advanced position, with the corresponding pulley 66 extending outwardly beyond the circular frame 18, as shown in full lines in FIG. 3. The arm 70 may be disengaged from the latching lug 74 so as to permit inward retracting movement of the pulley 66.

Figure 8:
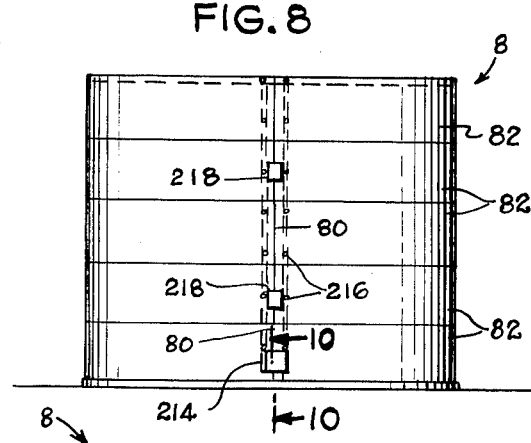
FIG. 8 is an elevational view of one of the partially completed bins, illustrating a method of forming a vertical slot or access opening in the bin.

The cables 50 are employed to pull the leading end portion of the strip 20 completely around the fixture 12. Thus, the leading end of the strip is wrapped into a cylindrical shape corresponding in diameter to the outside of the fixture 12. The leading portion or length of the strip is then severed from the coil 22 by the use of any desired or suitable cutting device, such as a cutting torch. The ends of the severed strip are then brought together and joined, preferably by a welding operation, to form a vertical joint 80, as shown in FIG. 8.

The formation of the welded joint 80 completes a cylindrical wall element 82 which is to become one section of the finished bin. The height of the section 82 corresponds to the width of the metal strip. This width may conveniently be five or six feet, for example. Several of the cylindrical elements or sections 82 must normally be welded or otherwise joined together to form the completed bin.

After being completed, the cylindrical section or element 82 is freed from the fixture 12 and is hoisted or raised upwardly by a distance slightly in excess of the height of the section 82. To make it easy to free each cylindrical section 82 from the fixture, provision may be made for decreasing the diameter of the fixture. Thus, the illustrated fixture 12 has a gap 86 in the circular outer frames 18 of the fixture. One or more jacks 88 or other devices may be provided for adjusting the width of the gap 86. After the cylindrical section 82 has been completed, the jacks 88 may be turned so as to reduce the width of the gap 86 and thereby diminish the diameter of the fixture 12. In this way, it becomes easy to hoist the section 82 upwardly, off the fixture 12.

For use in hoisting the cylindrical section or sections 82, the illustrated apparatus comprises a derrick or crane 92 which may comprise a boom 94 swingably mounted on a vertical mast 96. The lower end of the illustrated mast 96 is supported on a base 98 which is anchored to the ground. The mast 96 may be stabilized by a plurality of guy wires 100 connected between the top of the mast and the ground so as to hold the mast in a vertical position. Each guy wire is preferably strung over a pole or prop 101, located adjacent the circle of bins 8, so as to raise the guy wire to a level such that the guy wire will not interfere with the movement of the boom 94 around the mast 96.

By means of a pivot 104, the inner end of the boom 94 is connected to a swivel sleeve 106 which is rotatably received around the mast 96 and is restrained between upper and lower thrust collars 108 and 110. The swivel 106 makes it possible to swing the boom 94 in a horizontal circle around the mast 96. The boom 94 is swingable in a vertical direction about the pivot 104.

It is preferred to locate the mast 96 at the center of the circle of bins 8 so that the derrick 92 may be employed for erecting all of the bins 8. Thus, the boom 94 may be swung about the mast 96 into a position over any of the slabs 10 on which the bins 8 are to be constructed.

After all of the bins 8 have been completed, the boom 94 and the mast 96 are preferably retained as permanent components of a bulk materials handling plant for storing and handling fertilizer, salt, chemicals, and other bulk materials. It will be understood that stocks of bulk materials are stored in the bins 8. The bulk materials handling plant may be constructed and arranged in accordance with the applicant's invention as disclosed and claimed in his U.S. patent application Serial No. 204,293, filed June 21, 1962. Thus, the boom 94 may be employed to support and house conveyor equipment for removing bulk materials from the various bins 8.

Figure 5:
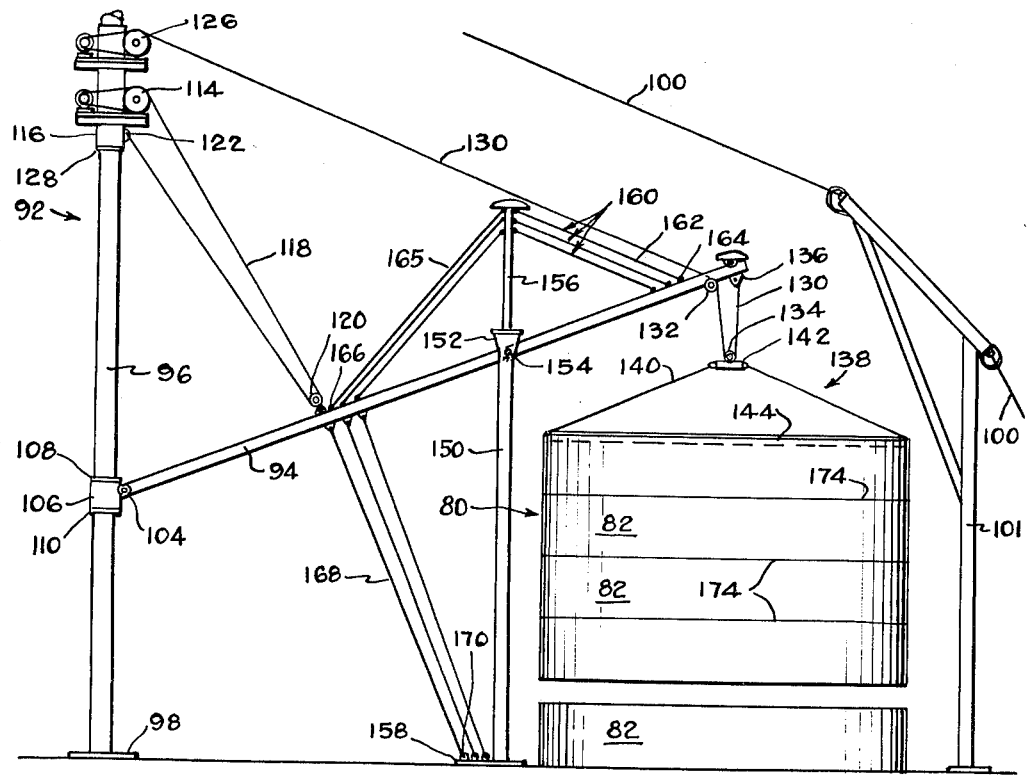
FIG. 5 is an elevational view showing the manner in which the completed portion of the tank is hoisted so that another section may be formed at the ground level and welded or otherwise joined to the lower end of the completed portion.

As illustrated by way of example in FIG. 5, the boom 94 is adapted to be raised and lowered by a winch 114 which is mounted on a swivel sleeve 116 rotatably received around the mast 96 near the top thereof. As shown, a cable 118 extends downwardly and outwardly from the winch 114, and is threaded under a pulley 120 mounted on the boom 94. The end of the cable 118 is brought upwardly and inwardly to an anchor 122 mounted on the swivel sleeve 116.

The section or sections 82 are adapted to be hoisted by another winch 126 which also has a swivel mounting on the mast 96. Thus, the winch 126 may also be mounted on the swivel sleeve 116. A thrust collar 128 may be provided on the mast 96 to support the swivel sleeve 116. A hoisting cable 130 extends downwardly and outwardly from the winch 126 and is threaded over a pulley 132 mounted on the boom 94 near its outer end. In this case, the cable 130 extends downwardly from the pulley 132 and is threaded under a pulley 134. The end of the cable is brought upwardly and connected to an anchor 136 on the outer end of the boom 94.

A suspension assembly or sling 138 may be employed to support the cylindrical section or sections 82. In this case, the suspension assembly 138 comprises a plurality of cables 140 which radiate outwardly and slope downwardly from a ring 142. The pulley 134 may be mounted on the ring 142. The lower ends of the cables 140 may be connected to a reinforcing ring 144 which may be welded or otherwise secured to the upper edge of the uppermost cylindrical section 82. The reinforcing ring 144 is sufficiently strong and rigid to maintain the circular shape of the cylindrical section 82 when the section is being hoisted. The reinforcing ring 144 may be retained as a permanent component of the finished bin 8 so as to reinforce the upper edge of the bin. Before the first cylindrical section 82 is formed around the circular fixture 12, the reinforcing ring 144 may be placed on top of the fixture 12 so that the upper edge portion of the metal strip 20 will be wrapped around the reinforcing ring 144. The upper edge of the metal strip may be welded to the reinforcing ring 144.

To provide additional support for the boom 94, it is preferred to employ an auxiliary construction mast 150 which may be provided with an eye 152 through which the boom extends. A pin 154 may be employed to secure the mast 150 to the boom 94. The mast 150 has an upper section 156 which extends above the eye 152.

It will be seen that the construction mast 150 is connected to the boom 94 at a point such that the mast 150 will be positioned closely adjacent the cylindrical sections 82. The lower end of the mast 150 may be provided with a base plate 158 which is anchored to the ground.

One or more guy cables 160 are preferably employed to minimize bending stresses in the boom 94. In this case, three parallel guy cables 160 are employed. Each cable 160 has a first section 162 which extends from an anchoring point 164 near the outer end of the boom 94 to the top of the upper mast section 156. A second section 165 of each guy cable 160 extends from the upper end of the upper mast section 156 to an anchoring point 166 which is located on the boom 94 at a point spaced inwardly toward the main mast 96 from the construction mast 150. Each guy cable 160 has a third section 168 which extends from the boom 94 to an anchoring point 170 on the base plate 158. The cables 160 and the construction mast 150 support most of the weight of the cylindrical sections 82 so that the stresses in the boom 94 are minimized.

Each successive cylindrical section 82 of the bin 8 is formed around the fixture 12 in the same manner as the first section. While the second section is being formed, the first section 82 is supported in an elevated position by the hoisting cable 130. After the second section has been completed, the first section is lowered so that its lower edge comes into engagement with the circular upper edge of the second section. The lower edge of the first section and the upper edge of the second section are then welded or otherwise joined together. Thus, in FIG. 5, a horizontal welded joint 174 is formed between the sections. The joined sections 82 are then hoisted upwardly so that the next section may be formed around the fixture 12.

FIG. 5 illustrates a stage in the construction of the bin 8 in which four of the cylindrical sections 82 have been formed, welded together and hoisted so that a fifth cylindrical section may be formed around the fixture 12. After the fifth section 82 has been completed, the four joined sections are lowered so as to bring the lower circular edge of the fourth section against the upper circular edge of the fifth section. The fourth and fifth sections may then be welded together. In most cases, electric arc welding is the most convenient and suitable method for joining the sections 82.

When all of the desired sections 82 have been formed and welded together, the fixture 12 is removed. This may be done by hoisting the joined sections to an elevation such that the lower edge of the lowermost section is above the fixture 12. The fixture 12 may then be dragged away to the next fundation slab 10 for use in making the next bin 8 in the circle of bins. The joined sections are then lowered onto the fundation slab 10.

After the bin 8 has thus been completed, the boom 94 and the construction mast 150 are moved to the location of the next bin to be constructed. This may be done by detaching the base plate 158 from the ground, operating the winch 114 to raise the boom 94, and swinging the boom in a horizontal direction around the main mast 96.

With the use of the method and apparatus of the present invention, the construction of the bins 8 proceeds very rapidly and easily. All of the welding operations are carried out at or near the ground level so that it is not necessary to erect any scaffolding or other supports for the workmen. All of the operations involving the handling or lifting of the metal strip are performed by power winches so that these operations are carried out very quickly and easily.

Each bin 8 is preferably formed with a vertical access slot 180 which extends through the wall of the bin for substantially the entire height thereof. As disclosed and claimed in the copending Robert F. Hozak application Serial No. 204,293, filed June 21, 1962, and the copending application of Robert F. Hozak and Tony Nagin, Serial No. 205,761, filed June 27, 1962, the slots 180 makes it possible for a conveyor boom to be moved downwardly into the bin 8 so that the bulk material contained in the bin may easily be removed therefrom. It will be seen that reinforcing bars 182 are welded or otherwise secured to the wall of the bin 8 on opposite sides of the slot 182. The illustrated bars 182 are L-shaped in cross section. As disclosed and claimed in the Hozak and Nagin application, Serial No. 205,761, L-shaped locking levers 184 may be provided to transmit tension across the slot 180 so that the shape and integrity of the bin 8 will be maintained. It will be understood that the weight of the bulk material in the bin 8 produces hoop tension in the wall of the bin. The L-shaped locking levers 184 prevent such hoop tension from pulling the bin apart at the slot 180.

Each of the illustrated locking levers 184 is swingable about a pivot pin 186 mounted on one of the reinforcing bars 182. Each lever 184 comprises locking arms 188 and 190 which extend at right angles to each other from the axis represented by the pin 186.

Adjacent its outer end, the locking arm 188 is formed with a latching slot 192 which opens laterally at right angles to the longitudinal axis of the arm 188. A similar latching slot 194 is formed in the arm 190. The slots 192 and 194 are adapted to interlock with a latching pin 196 mounted on one of the reinforcing bars 182 directly across the slot 180 from the pivot pin 186. A guide plate 198 is mounted on the latching pin 196 and is spaced outwardly from the reinforcing bar 182 on which the pin is mounted. The arms 188 and 190 are adapted to slip between the guide plate 198 and the corresponding bar 182.

With reference to the upper of the two locking levers 184 shown in FIG. 14, it will be seen that the locking arm 188 extends horizontally across the slot 180, while the locking arm 190 extends downwardly from the pivot 186. The slot 192 is interlocked with the pin 196. The locking lever 184 is adapted to be swung through an angle of 90 degrees so as to move the locking arm 190 across the slot 180 until the latching slot 194 is interlocked with the pin 196. Such movement of the locking lever 184 will be brought about automatically by upward movement of the conveyor boom. Conversely, downward movement of the conveyor boom will swing the upper locking lever 184 to the position shown in FIG. 14.

FIGS. 8–13 show a method of forming the vertical slot 180 in the bin, while maintaining the strength and shape of the bin. As shown to best advantage in FIGS.

10 and 11, the reinforcing bars 182 are employed to form a reinforcing frame 200 which is utilized to facilitate the formation of the slot 180. Temporary cross pieces or bars 202 are connected between the reinforcing bars 182 to join them together with the desired spaced relation during the construction operations.

The frame 200 also comprises a base section 204. The bars 182 are swingably connected to the base section 204 by hinges 206 comprising arms 208 and 210 which are connected together by a pivot pin 212. The arms 208 and 210 are secured to the bars 182 and the base section 204.

The reinforcing frame 200 is inserted inside the bin 8 through a rectangular opening 214 which is cut through the wall of the bin near the lower end thereof. The opening 214 may be formed with a cutting torch or in any other suitable manner. The base section 204 is welded or otherwise secured to the inside of the bin 8 below the opening 214. It will be seen that the opening 214 is formed in the portion of the bin along which the vertical welded joints 80 extend. In this way, the vertical welded joints 80 and the adjacent portions of the bin will be cut away in forming the vertical slot 180. It will be understood that the slot 180 is formed so that it will face inwardly toward the central mast 96 on which the boom 94 is mounted.

After being inserted through the opening 214, the frame 200 is swung upwardly into engagement with the inside of the bin 8. Holes 216 may be cut in the bin 8 to receive the pins 186 and 196 so that the bars 182 may be clamped flush against the inside of the bin. Alternatively, the pins 186 and 196 may be left off the bars 182 until after the slot 180 is formed. Additional openings 218 may be cut through the wall of the bin 8 to provide for the insertion of clamps to hold the bars 182 against the bin 8.

Next, the wall of the bin 8 is cut away, a little at a time, to form the slot 180. As the slot 180 is formed, the edges of the bin adjacent the slot are progressively welded or otherwise secured to the bars 182 so that the strength and shape of the bin will be maintained. Thus, for example, about six inches of the slot 180 may be cut at one time and the severed edge portions of the bin may then be welded to the bars 182.

After the slot 180 has been completed and the reinforcing bars 182 have been welded to the bin 8, the locking levers 184 may be mounted on the bars 182. Preferably, the levers 184 are mounted alternately on opposite sides of the slot 180. When the levers 184 are in place to take up the hoop tension in the bin 8, the temporary cross pieces 202 may be removed.

With the method of the present invention, the vertical access slot 180 is formed in the bin 8 very easily and quickly. The portion of the bin which includes the vertical seams 80 is removed in the course of forming the slot 180 so that the bin does not have any vertical seams other than those between the wall of the bin and the reinforcing bars 182.

Various modifications, alternative constructions and equivalents may be employed without departing from the true spirit and scope of the invention, as exemplified in the foregoing description and defined in the following claims.

I claim:
1. In a method of making generally cylindrical tanks or the like,
   the procedure comprising the steps of providing a flat foundation slab,
   mounting a temporary generally circular form on said slab,
   mounting a coil of metal strip on a turntable adjacent said form,
   pulling the leading end portion of said strip off said coil and around said form,
   severing said leading end portion from said coil,
   joining the ends of said leading end portion to provide a circular wall element to become a portion of the wall of the tank,
   hoisting said circular wall element by an amount corresponding to the height of said strip,
   forming a second circular wall element around said form in the same manner as said first-mentioned wall element,
   joining the lower circular edge of said first wall element to the circular upper edge of said second wall element to form a larger portion of the wall of the tank,
   and forming additional wall elements in the same manner as said first and second wall elements,
   each circular wall element being joined at its upper circular edge to the lower circular edge of the previously formed circular wall element.

2. In a method of making a generally cylindrical bin or the like,
   the steps of providing a generally circular fixture,
   mounting a coil of metal strip on a rotatable support adjacent said fixture,
   pulling the metal strip around said fixture to form a length of said strip into a cylindrical shape,
   severing said length from the coil,
   joining the ends of said severed length to form a cylindrical element to become a portion of the wall of the bin,
   hoisting said cylindrical element to an elevation corresponding generally to the height thereof,
   forming an additional cylindrical element around said fixture in the same manner as said first-mentioned cylindrical element,
   and joining the circular upper edge of said additional cylindrical element to the circular lower edge of the first cylindrical element.

3. In a method of making a generally cylindrical bin or the like,
   the steps of providing a foundation slab,
   positioning a generally circular fixture on said slab,
   mounting a coil of metal strip on a rotatable support adjacent said fixture,
   pulling the metal strip around said fixture to form a length of said strip into a cylindrical shape,
   severing said length from the coil,
   joining the ends of said severed length to form a cylindrical element to become a portion of the wall of the bin,
   hoisting said cylindrical element to an elevation corresponding generally to the height thereof,
   forming an additional cylindrical element around said fixture in the same manner as said first-mentioned cylindrical element,
   and joining the circular upper edge of said additional cylindrical element to the circular lower edge of the first-mentioned cylindrical element.

4. In a method of making a generally cylindrical bin or the like,
   the steps of providing a flat foundation slab,
   positioning a generally circular fixture on said slab,
   mounting a coil of metal strip on a rotatable support adjacent said fixture,
   pulling the metal strip around said fixture to form a length of said strip into a generally cylindrical shape,
   severing said length from the coil,
   joining the ends of said severed length to form a cylindrical element to become a portion of the wall of the bin,
   hoisting said cylindrical element to an elevation corresponding generally to the height thereof,
   forming one or more successive additional generally cylindrical elements around said fixture in the same manner as said first-mentioned cylindrical element,
   and joining the circular upper edge of each successive cylindrical element to the circular lower edge of the previously formed cylindrical element.

5. In a method of making a generally cylindrical bin or the like, the steps of providing a flat foundation, positioning a generally circular fixture on said foundation, mounting a coil of metal strip on a rotatable support adjacent said fixture, pulling a plurality of successive lengths of the metal strip around said fixture to form each length into a cylindrical shape, severing each successive length from the coil, joining the ends of each severed length to form a cylindrical element to become a portion of the wall of the bin, hoisting each cylindrical element to an elevation corresponding generally to the height thereof, and joining the circular upper edge of each successive cylindrical element to the circular lower edge of the previously formed cylindrical element.

6. In a method of making a generally cylindrical bin or the like, the steps of providing a flat foundation, positioning a generally circular fixture on said foundation, mounting a coil of metal strip on a rotatable support adjacent said fixture, pulling a length of the metal strip from said coil and around said fixture to form said length into a cylindrical shape, severing said length from the coil, joining the ends of said severed length to form a cylindrical element to become a portion of the wall of the bin, hoisting said cylindrical element to an elevation corresponding generally to the height thereof, forming a second generally cylindrical element around said fixture in the same manner as said first-mentioned cylindrical element, joining the circular upper edge of said second cylindrical element to the circular lower edge of the first cylindrical element, hosting the joined first and second cylindrical elements to an elevation corresponding generally to the height of each cylindrical element, forming an additional generally cylindrical element around said fixture in the same manner as said first cylindrical element, and joining the circular upper edge of said additional cylindrical element to the circular lower edge of said second cylindrical element.

References Cited by the Examiner
UNITED STATES PATENTS

| | | | |
|---|---|---|---|
| 1,619,232 | 3/1927 | Baker | 29—155 |
| 1,676,258 | 7/1928 | Fork | 29—155 |
| 2,446,148 | 7/1948 | Weightman | 29—200 |
| 2,605,202 | 7/1952 | Reynolds | 29—429 |
| 2,809,411 | 10/1957 | Dowse et al. | 29—200 |
| 3,151,391 | 10/1964 | Ollier | 29—429 |

WHITMORE A. WILTZ, *Primary Examiner.*

THOMAS H. EAGER, *Examiner.*